United States Patent
Kim et al.

(10) Patent No.: US 11,214,044 B2
(45) Date of Patent: Jan. 4, 2022

(54) MULTILAYER FILM COMPRISING POLYALKYLENE CARBONATE AND MANUFACTURING METHOD OF THE SAME

(71) Applicant: LG CHEM, LTD., Seoul (KR)

(72) Inventors: Hyun Min Kim, Daejeon (KR); Hyun Ju Cho, Daejeon (KR); Seung Young Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 103 days.

(21) Appl. No.: 15/768,749

(22) PCT Filed: Mar. 8, 2017

(86) PCT No.: PCT/KR2017/002524
§ 371 (c)(1),
(2) Date: Apr. 16, 2018

(87) PCT Pub. No.: WO2017/155308
PCT Pub. Date: Sep. 14, 2017

(65) Prior Publication Data
US 2018/0297337 A1    Oct. 18, 2018

(30) Foreign Application Priority Data
Mar. 8, 2016    (KR) .................. 10-2016-0027783

(51) Int. Cl.
*B32B 27/08*    (2006.01)
*B29C 48/00*    (2019.01)
(Continued)

(52) U.S. Cl.
CPC ............ *B32B 27/08* (2013.01); *B29C 48/022* (2019.02); *B32B 27/306* (2013.01); *B32B 27/32* (2013.01);
(Continued)

(58) Field of Classification Search
CPC ...... B32B 27/08; B32B 27/306; B32B 27/365; B32B 2270/00; B32B 2439/70; B32B 27/32–327; B29C 48/022; C08L 2201/10
See application file for complete search history.

(56) References Cited

U.S. PATENT DOCUMENTS

| | | | |
|---|---|---|---|
| 4,142,021 A | 2/1979 | Dixon et al. | |
| 4,912,149 A | 3/1990 | Robeson et al. | |

(Continued)

FOREIGN PATENT DOCUMENTS

| | | | |
|---|---|---|---|
| CN | 101585213 A | 11/2009 | |
| CN | 103087494 A | 5/2013 | |

(Continued)

OTHER PUBLICATIONS

JP 61-123542A English translation, 1986 (Year: 1986).*

(Continued)

*Primary Examiner* — Jasper Saberi
(74) *Attorney, Agent, or Firm* — Dentons US LLP

(57) ABSTRACT

The present disclosure relates to a multilayer film including polyalkylene carbonate, and more particularly to a multilayer film including a core layer prepared by blending polyalkylene carbonate and an ethylene vinyl acetate copolymer in a predetermined ratio, and an outer layer of polyolefin. The multilayer film does not have delamination behavior because two layers are adhered each other with a simple process without an additional step for introducing an oxygen-barrier layer even without adhesive or tie layers, and has an excellent oxygen barrier property. In addition, since an additional process for imparting barrier properties and a separate adhesive or tie layer are not required in the manufacturing method, the cost can be reduced and the layer structure can be simplified, which may greatly reduce the manufacturing cost.

6 Claims, 1 Drawing Sheet

(51) Int. Cl.

| | | |
|---|---|---|
| *B32B 27/32* | (2006.01) | |
| *C08L 69/00* | (2006.01) | |
| *C08G 64/02* | (2006.01) | |
| *C08G 64/32* | (2006.01) | |
| *B32B 27/36* | (2006.01) | |
| *B32B 27/30* | (2006.01) | |
| *B65D 65/40* | (2006.01) | |
| *B29C 48/08* | (2019.01) | |
| *B29C 48/21* | (2019.01) | |
| *B29K 23/00* | (2006.01) | |
| *B29K 69/00* | (2006.01) | |

(52) U.S. Cl.
CPC ............ *B32B 27/36* (2013.01); *B32B 27/365* (2013.01); *B65D 65/40* (2013.01); *C08G 64/02* (2013.01); *C08G 64/32* (2013.01); *C08L 69/00* (2013.01); *B29C 48/0018* (2019.02); *B29C 48/08* (2019.02); *B29C 48/21* (2019.02); *B29K 2023/0625* (2013.01); *B29K 2023/083* (2013.01); *B29K 2069/00* (2013.01); *B29K 2995/0067* (2013.01); *B32B 2250/03* (2013.01); *B32B 2250/40* (2013.01); *B32B 2270/00* (2013.01); *B32B 2307/412* (2013.01); *B32B 2307/7244* (2013.01); *B32B 2307/7246* (2013.01); *B32B 2307/746* (2013.01); *B32B 2439/70* (2013.01); *C08L 2201/10* (2013.01); *C08L 2201/14* (2013.01); *C08L 2203/16* (2013.01)

(56) References Cited

U.S. PATENT DOCUMENTS

| | | |
|---|---|---|
| 8,426,507 B2 | 4/2013 | Hong et al. |
| 9,050,743 B2 | 6/2015 | Choi et al. |
| 9,346,951 B2 | 5/2016 | Lee et al. |
| 9,662,863 B2 | 5/2017 | Lorenzetti et al. |
| 9,738,784 B2 | 8/2017 | Allen et al. |
| 2007/0100076 A1 | 5/2007 | Hayes et al. |
| 2012/0058346 A1 | 3/2012 | Jeon et al. |
| 2012/0196958 A1 | 8/2012 | Park et al. |
| 2012/0288709 A1* | 11/2012 | Jeon ........................ B32B 27/32 428/349 |
| 2013/0209775 A1* | 8/2013 | Allen ....................... C08L 23/06 428/220 |
| 2013/0210621 A1 | 8/2013 | Topolkaraev et al. |
| 2014/0005624 A1* | 1/2014 | Wang ....................... A61L 15/26 604/372 |
| 2014/0037965 A1 | 2/2014 | Jeon et al. |
| 2014/0302298 A1 | 10/2014 | Wilfong et al. |
| 2014/0370280 A1* | 12/2014 | Jung ........................ C08L 23/02 428/354 |
| 2015/0005419 A1 | 1/2015 | Jung et al. |

FOREIGN PATENT DOCUMENTS

| | | |
|---|---|---|
| JP | 61-123542 A | 6/1986 |
| JP | 2000202954 A | 7/2000 |
| JP | 2009-513793 A | 4/2009 |
| JP | 2014-503677 A | 2/2014 |
| KR | 10-0161647 B1 | 1/1999 |
| KR | 10-2012-0023553 A | 3/2012 |
| KR | 10-2012-0083627 A | 7/2012 |
| KR | 10-2012-0125721 A | 11/2012 |
| KR | 10-2013-0118233 A | 10/2013 |
| KR | 10-2013-0121106 A | 11/2013 |
| KR | 10-1351363 B1 | 1/2014 |
| KR | 10-2014-0063626 A | 5/2014 |
| KR | 10-2014-0127818 A | 11/2014 |
| KR | 10-2015-0035700 A | 4/2015 |
| KR | 10-2015-0087084 A | 7/2015 |
| WO | 2013013132 A1 | 1/2013 |

OTHER PUBLICATIONS

Hoffman et al, "Advances in Materials Science for Environmental and Energy Technologies", 2012, Wiley, pp. 89-92, https://www.google.com/books/edition/Advances_in_Materials_Science_for_Enviro/OBpThM6DaGIC?hl=en&gbpv=0 (Year: 2012).*

* cited by examiner

[FIG. 1]
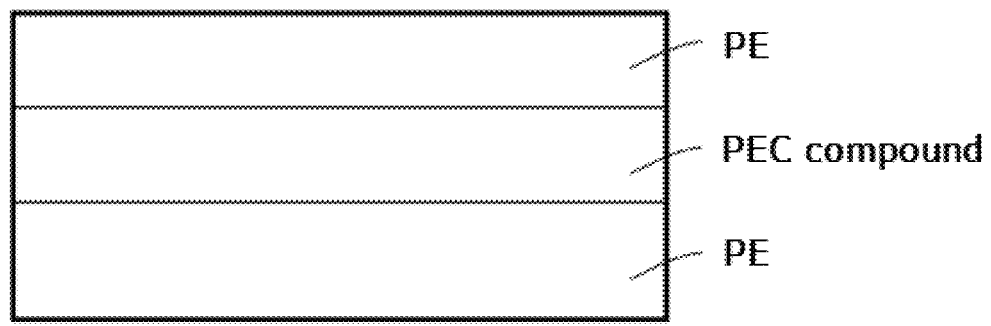
[FIG. 2]
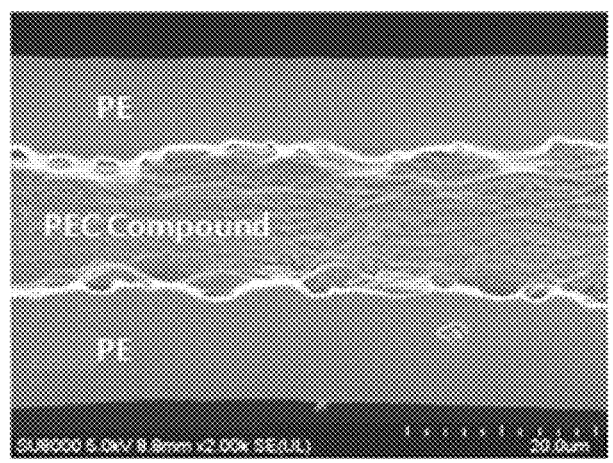

MULTILAYER FILM COMPRISING POLYALKYLENE CARBONATE AND MANUFACTURING METHOD OF THE SAME

CROSS-REFERENCE TO RELATED APPLICATIONS

This application is a National Stage Application of International Application No. PCT/KR2017/002524, filed on Mar. 8, 2017, which claims the benefit of Korean Patent Application No. 10-2016-0027783, filed on Mar. 8, 2016, and Korean Patent Application No. 10-2017-0029106, filed on Mar. 7, 2017, all of which are hereby incorporated by reference in their entirety for all purposes as if fully set forth herein.

TECHNICAL FIELD

The present disclosure relates to a multilayer film including a polyalkylene carbonate, and a manufacturing method of the same. More specifically, the present disclosure relates to a polyalkylene carbonate-containing multilayer film which does not have delamination behavior between films while not introducing a separate adhesive layer, and has an excellent oxygen barrier property.

BACKGROUND OF THE INVENTION

Plastics are used as materials for various articles due to their ease of manufacture and ease of use, and they are used in various fields such as for disposable articles such as packaging films, disposable containers like disposable cups and disposable dishes, as well as building materials and automobile interior materials.

Particularly, since polyalkylene carbonate resins have transparency and a high oxygen barrier property, they have an advantage of preserving freshness of food for a long time when applied for food packaging. However, the polyalkylene carbonate resins have a feature that the produced films adhere to each other at room temperature due to the low glass transition temperature (Tg, ~20° C.) and adhesive property, thereby making it difficult to be used alone. Also, polyolefin films are generally used as films for food packaging, but polyolefin films have a disadvantage in that, while they have a good moisture barrier property, they have a low oxygen barrier property.

In this respect, when a polyolefin film/polyalkylene carbonate film/polyolefin film is produced, it is possible to make a film for food packaging with a good oxygen barrier property, since the high oxygen barrier property of the polyalkylene carbonate film and the property of the conventional polyolefin film for food packaging are combined. However, the polyalkylene carbonate film having a polar or hydrophilic character and a polyolefin film having a non-polar or hydrophobic character are not compatible due to differences in physical properties. As a result, there is a problem in that direct bonding cannot be achieved at room temperature or even at a high temperature even if heat fusion is applied.

On the other hand, Korean Patent Publication No. 2015-0087084 discloses a method of introducing a tie layer as an adhesive layer between such a polyolefin film and a polyalkylene carbonate film. However, if the tie layer is introduced in this way, adhesion is possible, but it is disadvantageous in that manufacture is complicated because it must be processed in 5 layers or more. In addition, the introduction of an expensive tie layer may result in lower price competitiveness of final products.

Therefore, efforts have been made to develop a multilayer film in which a polyolefin film and a polyalkylene carbonate film are effectively adhered while not introducing a separate adhesive layer like a tie layer.

DETAILS OF THE INVENTION

Objects of the Invention

It is an object of the present disclosure to provide a polyalkylene carbonate-containing multilayer film which does not have delamination behavior between films while not introducing a separate adhesive layer, and has an excellent oxygen barrier property.

It is another object of the present disclosure to provide a method for effectively manufacturing a multilayer film including a polyalkylene carbonate.

Means for Achieving the Object

According to an embodiment of the present disclosure, a multilayer film including: a core layer including 60 to 80 wt % of at least one polyalkylene carbonate and 20 to 40 wt % of at least one ethylene vinyl acetate copolymer; and an outer layer adjacent to the core layer and including 50 wt % or more of at least one polyolefin, is provided.

The polyalkylene carbonate may have a weight average molecular weight of 30,000 to 300,000 g/mol, and may be polyethylene carbonate, polypropylene carbonate, or a mixture thereof.

In addition, the polyalkylene carbonate may be a polycarbonate copolymer or a terpolymer obtained by reacting carbon dioxide with at least one epoxide compound selected from the group consisting of a C2-20 alkylene oxide substituted or unsubstituted with a halogen or a C1-10 alkoxy group; a C4-20 cycloalkylene oxide substituted or unsubstituted with a halogen or a C1-10 alkoxy group; and a C8-20 styrene oxide substituted or unsubstituted with a halogen, a C1-10 alkoxy group, a C1-10 alkyl group, or a C6-20 aryl group.

The ethylene vinyl acetate copolymer may have vinyl acetate units in an amount of 20 wt % to 40 wt %.

The total thickness of the multilayer film of the present disclosure may be 100 μm or less, and the oxygen permeability measured by the method of ASTM D 3985 may be 500 cc/m²·day·bar or less.

According to another embodiment of the present disclosure, a manufacturing method of a multilayer film including the steps of: a) mixing 60 to 80 wt % of at least one polyalkylene carbonate with 20 to 40 wt % of at least one ethylene vinyl acetate copolymer to prepare a first resin composition; b) preparing a second resin composition including 50 wt % or more of at least one polyolefin; and c) melting the first resin composition and the second resin composition, and then coextruding using a blown or casting type of film forming machine, is provided.

During coextrusion of step c), the first resin composition and the second resin composition may be laminated in two or more layers, the first resin composition may be melted and extruded at 130 to 200° C., and the second resin composition may be melted and extruded at 140 to 250° C.

Effects of the Invention

According to the present disclosure, a 2-layer or 3-layer multilayer film with an excellent oxygen barrier property and the like can be effectively produced by arranging the film layer prepared by blending polyalkylene carbonate and an ethylene vinyl acetate copolymer in a predetermined ratio in the core layer, and effectively adhering the outer layer including the core layer and the polyolefin thereto without a separate adhesive layer.

BRIEF DESCRIPTION OF DRAWINGS

FIG. 1 is a schematic diagram showing a 3-layer multilayer film structure according to an embodiment of the present disclosure.

FIG. 2 is a SEM image of a 3-layer multilayer film according to an embodiment of the present disclosure.

DETAILED DESCRIPTION OF THE EMBODIMENTS

In the present disclosure, the terms "first", "second", and the like are used to describe a variety of components, and these terms are merely employed to differentiate a certain component from other components.

In addition, technical terms used in the present specification are only for explaining exemplary embodiments, and they are not intended to restrict the present invention. The singular expressions may include the plural expressions unless they are differently expressed contextually. It should be understood that the terms "include", "equip", "have", or the like are used to designate the existence of characteristics taken effect, numbers, steps, components, or combinations thereof, and do not exclude the existence or the possibility of addition of one or more different characteristics, numbers, steps, components, or combinations thereof beforehand.

As the present invention may be variously modified and have various forms, specific examples will be explained in more detail. However, it is not intended to limit the present invention to the specific examples, and it must be understood that the present invention includes all modifications, equivalents, or replacements within the spirit and technical scope of the present invention.

Hereinafter, a multilayer film including polyalkylene carbonate, and a manufacturing method of the same, will be explained in more detail.

According to an embodiment of the present disclosure, a multilayer film including: a core layer including 60 to 80 wt % of at least one polyalkylene carbonate and 20 to 40 wt % of at least one ethylene vinyl acetate copolymer; and an outer layer adjacent to the core layer and including 50 wt % or more of at least one polyolefin, is provided.

In particular, the present disclosure relates to a multilayer film, for example a PE-PEC compound-PE coextruded blown film, which is prepared by a manufacturing method including the steps of forming a core layer with a masterbatch pellet prepared by blending ethylene vinyl acetate resin (EVA) into polyethylene carbonate resin (PEC), and forming an outer layer with a polyolefin resin. Such a multilayer film is characterized by having an excellent oxygen barrier property without delamination behavior between films.

The core layer of the multilayer film includes 60 to 80 wt % of at least one polyalkylene carbonate and 20 to 40 wt % of at least one ethylene vinyl acetate copolymer.

The polyalkylene carbonate in the core layer is preferably contained at as much as possible, and particularly the content should be 60 wt % or more in terms of achieving the oxygen barrier property. However, the content should be 80 wt % or less in terms of achieving the high oxygen barrier property and excellent adhesion with the olefin resin. In addition, the content of the ethylene vinyl acetate copolymer should be 20 wt % or more in terms of adhesion with the olefin resin, and 40 wt % or less in terms of achieving the oxygen barrier property and transparency of the film. More preferably, the polyalkylene carbonate content may be from 65 to 75 wt %, and the ethylene vinyl acetate copolymer content may be from 25 to 35 wt %.

In particular, the polyalkylene carbonate has good compatibility with the ethylene vinyl acetate, and they are uniformly mixed. In addition, the ethylene vinyl acetate has good compatibility with the olefin, thereby acting as a bridge between the polyalkylene carbonate and the olefin. However, since the ethylene vinyl acetate has a poor oxygen barrier property, when it is mixed at an excessive amount, the oxygen barrier property is lowered. Therefore, it is preferable that it is included in an amount of 40 wt % or less in terms of achieving the high oxygen barrier property. However, if the amount of ethylene vinyl acetate is greatly reduced in order to improve the oxygen barrier property, the adhesion with the olefin resin is deteriorated and delamination occurs. Therefore, it should be included in an amount of 20 wt % or more in terms of preventing delamination. In particular, it is most preferable to use a resin having ethylene vinyl acetate with a high vinyl acetate content. For example, the vinyl acetate content in the ethylene vinyl acetate resin is more preferably 4 to 16 wt % based on the total compound. Also, the ethylene vinyl acetate resin has a different refractive index from that of the polyalkylene carbonate. Therefore, it is not preferable to mix the ethylene vinyl acetate resin excessively, because the turbidity of the film increases. Therefore, it is necessary to maintain the above-mentioned composition in terms of maintaining the oxygen barrier property and transparency of the multilayer film while maintaining the adhesion with the olefin film.

The polyalkylene carbonate may have a weight average molecular weight of 30,000 to 300,000 g/mol, preferably 45,000 to 280,000 g/mol, and more preferably 50,000 to 250,000 g/mol, and may be polyethylene carbonate, polypropylene carbonate, or a mixture thereof.

In addition, the polyalkylene carbonate is a polycarbonate copolymer or a terpolymer obtained by reacting carbon dioxide with at least one epoxide compound selected from the group consisting of: a C2-20 alkylene oxide substituted or unsubstituted with a halogen or a C1-10 alkoxy group; a C4-20 cycloalkylene oxide substituted or unsubstituted with a halogen or a C1-10 alkoxy group; and a C8-20 styrene oxide substituted or unsubstituted with a halogen, a C1-10 alkoxy group, a C1-10 alkyl group, or a C6-20 aryl group.

The vinyl acetate of the ethylene vinyl acetate copolymer resin used in the present disclosure is preferably contained at as much as possible, and the content of the vinyl acetate units in the ethylene vinyl acetate copolymer may be 20 wt % to 40 wt %, or 25 wt % to 40 wt %. The vinyl acetate content in the ethylene vinyl acetate resin may be 4 to 16 wt %, or 5 to 15 wt %, and for example, 7 to 15 wt %, based on the total compound.

In addition, the multilayer film of the present disclosure includes an outer layer adjacent to the core layer, and including 50 wt % or more of at least one polyolefin. The content of the polyolefin in the outer layer should be 50 wt % or more in terms of achieving excellent tensile strength. For example, the polyolefin may be prepared by mixing low-density polyethylene (LDPE) with a main component of linear low-density polyethylene (LLDPE) in an amount of 10 to 20 wt % based on the total amount of LLDPE to improve processability. The weight percent of the LLDPE and LDPE resins may be 9 wt % or more based on the total weight, and preferably the sum of LLDPE and LDPE may be about 70 wt % based on the total weight. The polyolefin may further include at least one additive such as an amide-based slip agent in an amount of 1000 ppm or less, or 100 to 1000 ppm.

In addition, the polyolefin may have a melt flow rate (MI) of 0.7 to 2.0, and a molecular weight distribution (Mn/Mw) of 3 to 5.

As described above, since the multilayer film of the present disclosure includes the core layer obtained by blending the polyethylene carbonate (PEC) or the like and the ethylene vinyl acetate copolymer (EVA), and the outer layer including the polyolefin, it does not have delamination behavior between films while not introducing a separate adhesive layer, and has an excellent oxygen barrier property.

The polyalkylene carbonate film according to the present disclosure improves the adhesion with the polyolefin by blending a certain amount of EVA into PEC, because it does not directly adhere to the polyolefin film. Further, it maintains the oxygen barrier property of the PEC at a certain level by optimizing the amount of EVA, and the oxygen barrier property is more than four times higher than that of a single polyolefin film of the same thickness.

In particular, the multilayer film may have a total film thickness of 100 μm or less, or 10 to 100 μm, preferably 70 μm or less, or 55 μm or less. Each layer of the multilayer film may have a uniform thickness, which may be confirmed through SEM analysis. The oxygen permeability measured by the method of ASTM D 3985, the standard of the American Society for Testing Materials, may be 500 cc/m$^2$·day·bar or less (measured at 23° C., relative humidity 0%, 50%, 90%), or 3 to 500 cc/m$^2$·day·bar, preferably 300 cc/m$^2$·day·bar or less, and more preferably 100 cc/m$^2$·day·bar or less. At the same time, the multilayer film has a very high moisture barrier property, and the water permeability may be 10 g/m$^2$·day or less, or 0.1 to 10 g/m$^2$·day, preferably 8 g/m$^2$·day or less, and more preferably 8 g/m$^2$·day or less, when measured under conditions of 37° C. and 100% relative humidity. Further, since the multilayer film of the present disclosure does not allow separation of the core layer and the outer layer from each other, it is impossible to measure the peel strength separately. However, it can be evaluated to have excellent adhesion, because the multilayer film does not have delamination behavior between the core layer and the outer layer while not introducing a separate adhesive layer.

According to another embodiment of the present disclosure, a manufacturing method of the multilayer film including polyalkylene carbonate is provided. Specifically, the manufacturing method of the multilayer film includes the steps of: a) mixing 60 to 80 wt % of at least one polyalkylene carbonate with 20 to 40 wt % of at least one ethylene vinyl acetate copolymer to prepare a first resin composition; b) preparing a second resin composition including 50 wt % or more of at least one polyolefin; and c) melting the first resin composition and the second resin composition, and then coextruding using a blown or casting type of film forming machine.

In the present disclosure, it is possible to manufacture a blown film by adjusting the winding speed of the film to control the thickness of the film.

Particularly, in the manufacturing method of the multilayer film according to the present disclosure, the core layer obtained by blending the polyalkylene carbonate and the ethylene vinyl acetate copolymer is adhered to the outer layer including the polyolefin. Therefore, the multilayer film according to the present disclosure is characterized by a 2-layer or 3-layer film compared with a 5-layer film introducing a tie layer, which is a conventional adhesive layer, thereby effectively reducing the entire production cost through a very simple manufacturing process.

First, step a) of preparing the first resin composition constituting the core layer in the multilayer film of the present disclosure is carried out by blending the polyethylene carbonate (PEC) or the like and the ethylene vinyl acetate copolymer (EVA). In addition, a master batch may be produced by dry blending PEC resin and EVA resin at a certain ratio using a twin screw extruder at a temperature of 70 to 180° C.

Herein, the content of the polyalkylene carbonate in the first resin composition should be 60 wt % or more in terms of the oxygen barrier property, and 80 wt % or less in terms of adhesion with the olefin resin. In addition, the content of the ethylene vinyl acetate should be 20 wt % or more in terms of adhesion with the olefin resin, and 40 wt % or less in terms of the oxygen barrier property and transparency of the film. Preferably, the polyalkylene carbonate content may be from 65 to 75 wt %, and the ethylene vinyl acetate copolymer content may be from 25 to 35 wt %.

Further, step b) of preparing the second resin composition constituting the outer layer together with the first resin composition in the multilayer film of the present disclosure is carried out.

The content of the polyolefin in the second resin composition should be 50 wt % or more in terms of achieving excellent tensile strength.

Herein, kinds, molecular weights, ranges of physical properties, composition characteristics, etc. related to the polyalkylene carbonate, ethylene vinyl acetate copolymer, and polyolefin in the first and second resin compositions are as described above.

After preparing the first composition and the second resin composition, step c) of melting these compositions, and then coextruding using a blown or casting type of film forming machine, is carried out.

The first resin composition and the second resin composition may be laminated in two or more layers during the coextrusion of step c). In addition, the first resin composition may be melted and extruded at 130 to 200° C., and the second resin composition may be melted and extruded at 140 to 250° C., during coextrusion. For example, the melt extrusion may be carried out in a general coextrusion process, and there is an advantage in that a conventional coextrusion facility for LDPE can be used without a special facility. In addition, a master batch may be produced using a twin screw extruder at a temperature of 70 to 180° C. before blown film extruding the PEC resin and EVA resin.

The manufacturing method of the multilayer film may further include steps that are commonly performed in the art of the present invention, in addition to the steps described above.

Hereinafter, preferred embodiments of the present invention will be described in detail. However, these examples are for illustrative purposes only, and the invention is not intended to be limited by these examples.

EXAMPLES

Example 1

30 wt % of EVA resin (LG Chem, EC33018 Grade, VA content 33 wt %) was mixed with 70 wt % of PEC resin (total 100% by weight), and dried in a vacuum oven at 40°

C. for 12 hours or more, followed by compounding using a twin-screw extruder to obtain pellets. Using a blown film facility capable of producing a 3-layer film, a film to which the pellet was applied was prepared on the inner layer, and an LLDPE (LG Chemical S1020L Grade) film was prepared on the outer layer by a coextrusion blown film process, followed by obtaining a 3-layer film having a thickness of about 50 μm. It was observed whether the 3-layer film was delaminated by each layer, and the oxygen permeability was measured by the method of ASTM D 3985 with this film.

Example 2

A multilayer film was prepared and evaluated for properties in the same manner as in Example 1, except that the content of EVA was changed to 40 wt % and blended with PEC.

Comparative Example 1

A 3-layer film (PE-PEC compound-PE film) having a thickness of about 50 μm was prepared in the same manner as in Example 1, except that a film in which PEC blended with 10 wt % of EVA was applied was prepared on the inner layer, and the outer layer was coextruded by applying LLDPE. It was observed whether the 3-layer film was delaminated by each layer.

Comparative Example 2

A 3-layer film (PE-PEC compound-PE film) having a thickness of about 50 μm was prepared in the same manner as in Example 1, except that a film in which PEC blended with 15 wt % of EVA was applied was prepared on the inner layer, and the outer layer was coextruded by applying LLDPE. It was observed whether the 3-layer film was delaminated by each layer.

Comparative Example 3

A 3-layer film (PE-PEC-PE film) having a thickness of about 50 μm was prepared in the same manner as in Example 1, except that a film in which PEC was applied alone without blending EVA was prepared on the inner layer, and the outer layer was coextruded by applying LLDPE. It was observed whether the 3-layer film was delaminated by each layer.

Comparative Example 4

A film having a thickness of about 50 μm was prepared in the same manner as in Example 1, except that PEC was not used and LLDPE was applied alone. The oxygen permeability was measured by the method of ASTM D 3985.

The films were prepared according to Examples 1 and 2 and Comparative Examples 1 to 4, and their properties were evaluated. The results are shown in Table 1 below.

TABLE 1

| | Delamination behavior | Oxygen permeability (cc/m²·day-bar) |
|---|---|---|
| Example 1 | delamination did not occur | 500 |
| Example 2 | delamination did not occur | 800 |
| Comparative Example 1 | delamination occurred | — |
| Comparative Example 2 | delamination occurred | — |
| Comparative Example 3 | delamination occurred | — |
| Comparative Example 4 | — | 1900 |

As shown in Table 1, when the 3-layer film of PE-PEC compound-PE was prepared by optimizing the EVA content in the core layer according to Examples 1 and 2 of the present invention, it was possible to manufacture a food packaging film having a good oxygen barrier property by combining the high oxygen barrier property of the PEC and the LLDPE film characteristics of the conventional food packaging without delamination behavior between the core layer and the outer layer. Particularly, in the case of Example 1, when the oxygen permeability of the prepared film was measured, it was confirmed that there was an excellent effect of remarkably reducing the oxygen permeability to about ¼ compared with the LDPE film of the same thickness.

Moreover, when the tie layer is applied in a known manner, it is disadvantageous in that manufacture is complicated, because it must be manufactured with five layers or more of olefin-tie-PEC-tie-olefin. In addition, the introduction of expensive tie layers may result in lower price competitiveness of final products.

The invention claimed is:

1. A multilayer film comprising:
   a core layer comprising 70 to 80 wt % of a polyethylene carbonate and 20 to 30 wt % of at least one ethylene vinyl acetate copolymer; and
   an outer layer adjacent to the core layer and comprising 50 wt % or more of at least one polyolefin,
   wherein the ethylene vinyl acetate copolymer has vinyl acetate units in an amount of 20 wt % to 40 wt %,
   wherein the vinyl acetate content in the core layer is 4 to 12 wt %,
   wherein the film has a water permeability of 10 g/m²·day·bar or less, when measured under conditions of 37° C. and 100% relative humidity, and an oxygen permeability measured by ASTM D 3985 of 500 cc/m²·day·bar or less.

2. The multilayer film according to claim 1, wherein the polyalkylene carbonate has a weight average molecular weight of 30,000 to 300,000 g/mol.

3. The multilayer film according to claim 1, wherein the polyethylene carbonate is a polycarbonate copolymer or a terpolymer obtained by reacting carbon dioxide with at least one epoxide compound selected from the group consisting of a C2-20 alkylene oxide substituted or unsubstituted with a halogen or a C1-10 alkoxy group; a C4-20 cycloalkylene oxide substituted or unsubstituted with a halogen or a C1-10 alkoxy group; and a C8-20 styrene oxide substituted or unsubstituted with a halogen, a C1-10 alkoxy group, a C1-10 alkyl group, or a C6-20 aryl group.

4. The multilayer film according to claim 1, wherein the total thickness of film is 100 μm or less.

5. A manufacturing method of a multilayer in comprising the steps of: a) mixing 70 to 80 wt % of a polyethylene carbonate with 20 to 30 wt % of at least one ethylene vinyl acetate copolymer to prepare a first resin composition; b) preparing a second resin composition comprising 50 wt % or more of at least one polyolefin; and c) melting the first resin composition and the second resin composition, and then coextruding using a blown or casting type of film forming machine, wherein the first resin composition and the second resin composition are laminated in two or more layers during the coextrusion of step c), wherein the first resin composition forms a core layer and the second resin composition forms an outer layer adjacent to the core layer, wherein the ethylene vinyl acetate copolymer has vinyl acetate units in an amount of 20 wt % to 40 wt %, wherein the vinyl acetate content in the core layer is 4 to 12 wt %, wherein the film has a water permeability of 10 $g/m^2$-day-bar or less, when measured under conditions of 37° C. and 100% relative humidity, and an oxygen permeability measured by ASTM D 3985 of 500 $cc/m^2$-day-bar or less.

6. The manufacturing method according to claim 5, wherein the first resin composition is melted and extruded at 130 to 200° C., and the second resin composition is melted and extruded at 140 to 250° C., during the coextrusion of step c).

* * * * *

UNITED STATES PATENT AND TRADEMARK OFFICE
CERTIFICATE OF CORRECTION

| | | |
|---|---|---|
| PATENT NO. | : 11,214,044 B2 | Page 1 of 1 |
| APPLICATION NO. | : 15/768749 | |
| DATED | : January 4, 2022 | |
| INVENTOR(S) | : Hyun Min Kim et al. | |

It is certified that error appears in the above-identified patent and that said Letters Patent is hereby corrected as shown below:

On the Title Page

Item (30), should read as follows:
Foreign Application Priority Data
Mar 8, 2016 (KR).................................. 10-2016-0027783
Mar 7, 2016 (KR).................................. 10-2017-0029106

Signed and Sealed this
Nineteenth Day of December, 2023

Katherine Kelly Vidal
*Director of the United States Patent and Trademark Office*